(12) United States Patent
Sugawara et al.

(10) Patent No.: US 7,080,306 B1
(45) Date of Patent: Jul. 18, 2006

(54) DISK DEVICE WITH IMPROVED ERROR-CORRECTION CAPABILITY

(75) Inventors: Takayuki Sugawara, Fukushima-ken (JP); Hiroki Hirashima, Fukushima-ken (JP); Isao Asano, Fukushima-ken (JP); Kyoichi Shirane, Kanagawa-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/511,931

(22) Filed: Feb. 24, 2000

(30) Foreign Application Priority Data

Feb. 25, 1999 (JP) .................................. 11-047937

(51) Int. Cl.
*G11B 20/18* (2006.01)

(52) U.S. Cl. ....................................... 714/755; 714/769
(58) Field of Classification Search ................. 714/755, 714/769
See application file for complete search history.

(56) References Cited

U.S. PATENT DOCUMENTS

| | | | | |
|---|---|---|---|---|
| 4,716,566 A | | 12/1987 | Masuhara et al. ............. 371/37 |
| 4,833,679 A | * | 5/1989 | Anderson et al. ............. 714/758 |
| 4,849,975 A | * | 7/1989 | Patel ............................ 714/761 |
| 5,271,012 A | * | 12/1993 | Blaum et al. ................... 714/6 |
| 5,293,388 A | * | 3/1994 | Monroe et al. ................... 714/5 |
| 5,351,246 A | * | 9/1994 | Blaum et al. ................... 714/6 |
| 5,517,484 A | * | 5/1996 | Takagi et al. ............. 369/53.35 |
| 5,684,773 A | * | 11/1997 | Hayashi ........................ 369/59 |
| 5,734,814 A | * | 3/1998 | Corbin et al. ................. 711/114 |
| 5,737,344 A | * | 4/1998 | Belser et al. ..................... 714/6 |
| 5,768,502 A | * | 6/1998 | Ikushima et al. ............... 714/5 |
| 5,872,800 A | * | 2/1999 | Glover et al. ................ 714/766 |
| 5,956,757 A | * | 9/1999 | Sun ............................. 711/211 |
| 6,021,463 A | * | 2/2000 | Belser ......................... 711/114 |
| 6,223,321 B1 | * | 4/2001 | Nasu et al. .................. 714/769 |
| 6,252,961 B1 | * | 6/2001 | Hogan .......................... 380/37 |
| 6,259,659 B1 | * | 7/2001 | Fechser et al. ............. 369/47.1 |
| 6,357,030 B1 | * | 3/2002 | Demura et al. .............. 714/755 |
| 6,363,511 B1 | * | 3/2002 | Massoudi .................... 714/755 |
| 6,385,744 B1 | * | 5/2002 | Ando et al. ................... 714/54 |
| 6,393,561 B1 | * | 5/2002 | Hagiwara et al. ............ 713/100 |
| 6,608,804 B1 | * | 8/2003 | Shim ......................... 369/53.22 |
| 6,662,334 B1 | * | 12/2003 | Stenfort ....................... 714/769 |
| 6,754,018 B1 | * | 6/2004 | Takahashi ..................... 360/53 |

* cited by examiner

*Primary Examiner*—Stephen M. Baker
(74) *Attorney, Agent, or Firm*—Brinks Hofer Gilson & Lione

(57) ABSTRACT

A disk device for performing error-correction processing is loaded with a high-reliability disk to which a C1 code as a low-level error-correction code (ECC) is added for every sector, and a C2 code as a high-level ECC is added for every plurality of sectors. A host computer includes a device driver corresponding to the high-reliability disk. When data written to the high-reliability disk is read, low-level error-correction is performed based on the C1 code in units of one block corresponding to one sector, and the corrected data is notified to the host computer. Simultaneously, the C2 code along with the data for a plurality of blocks is loaded, and high-level error correction based on the C2 code is thereby performed.

2 Claims, 3 Drawing Sheets

DISK DEVICE WITH IMPROVED ERROR-CORRECTION CAPABILITY

BACKGROUND OF THE INVENTION

1. Field of the Invention

The present invention relates to disk devices in which error-correction processing is performed when an error occurs during reading of data from disks.

2. Description of the Related Art

FIG. 4 illustrates error-correction processing performed by a conventional disk device.

A disk device shown in FIG. 4 is used for reading data from and writing data to a conventional flexible disk. A disk drive 10 and a host computer 30 are connected by a predetermined interface. The disk drive 10 loads a disk 16 having a predetermined format in a disk drive body 14. The host computer 30 includes an operating system (OS) 31 and a device driver 32 for controlling the disk drive body 14. Data delivery is performed between the disk drive body 14 and the OS 31 by means of the device driver 32.

An error-correction code (hereinafter referred to as an "ECC"), such as a C1 code of Reed Solomon codes, is added along with data itself to a signal written to the disk 16 for every sector. Error correction is performed by reading and processing the ECC when reading data.

The conventional disk device is provided with an error-correction unit on a processing circuit of the disk drive 10. Using the ECC, such as the C1 code, read from the disk, the error-correction unit in the disk drive 10 performs error correction in units of one block (physical block address; PBA) corresponding to data in one sector.

A flexible magnetic disk for high-density storage with a capacity of, for example, approximately 200 MB, has a substantially smaller track width than a conventional disk due to increased writing density. The disk for high-density storage has a much higher writing frequency. When an error occurs in read data due to a defect or dirt on the surface of the disk, the size of the region influenced by such a defect or dirt is substantially increased, so as to extend over a plurality of sectors. In such a case, an error may not be recovered by error correction in data units (PBA units) for one sector based on the ECC, such as the C1 code.

It has therefore been proposed to provide a hardware error-correction unit having an error correction capability higher than the above error-correction unit. In order to provide such an error-correction unit, a CPU contained in the disk drive 10 must be replaced by one with a greater operational capacity. It is also necessary to increase the memory capacity. Thus, an electronic circuit installed in the disk drive 10 must be very expensive.

SUMMARY OF THE INVENTION

Accordingly, it is an object of the present invention to provide a disk drive having an error-correction capability higher than that of a conventional device without modifying the disk drive hardware.

According to one aspect of the present invention, there is provided a disk device including a disk drive including a head for reading data written to a disk and a processing circuit for processing the data, and a host computer connected to the disk drive through an interface. The processing circuit of the disk drive includes a low-level error-correction unit for performing error correction of the data written to the disk in units of one block. The host computer includes a high-level error-correction unit for performing error correction of the read data supplied through the interface in units of a plurality of blocks.

For example, the low-level error-correction unit performs error correction for every block, where one block corresponds to one sector in which one piece of data is written. Data in every block are grouped as a plurality of blocks, and the high-level error correction performs error correction for every plurality of blocks.

Accordingly, when an error that extends over sectors is caused by a defect or dirt on the surface of a disk, which has been uncorrectable hitherto, it is possible to recover data read from the disk. In such a case, the high-level error-correction unit may be simply obtained by installing software in the host computer. It is therefore unnecessary to implement hardware modifications, such as building a new arithmetic circuit on the disk drive circuit, increasing the capability of a CPU, and increasing the storage capacity.

A high-reliability disk to which both a low-level ECC and a high-level ECC are written and a disk to which only the low-level ECC is written may be loaded into the disk drive. When the high-reliability disk is loaded, the processing circuit of the disk drive performs low-level error correction, and then the host computer, to which the corrected data is supplied, performs high-level error correction. When the latter disk is loaded, the processing circuit of the disk drive performs low-level error correction, and the host computer processes the corrected data.

For example, the high-reliability disk includes a SYNC region, a data region, and a low-level ECC (for example, a C1 code) for every sector. The high-reliability disk also includes a high-level ECC (for example, a C2 code) for every plurality of sectors. In contrast, only a low-level ECC (for example, a C1 code) is written to the latter disk. When the high-reliability disk is loaded into the disk drive, the processing circuit of the disk drive performs error correction based on the low-level ECC. The corrected data is supplied to the host computer, and the host computer performs error correction based on the high-level ECC in units of blocks (logical block address; LBA). When the disk other than a high-reliability type is loaded, the disk drive only performs error correction based on the low-level ECC. The corrected data is supplied to the host computer.

When writing data to the high-reliability disk, the host computer processes a low-level ECC for every sector and adds the low-level ECC to the data. In addition, the host computer processes a high-level ECC for every plurality of sectors and adds the high-level ECC to the data.

Information may be written to a disk for discriminating a high-reliability disk to which both a low-level ECC and a high-level ECC are written from a disk to which only the low-level error correction is written. The host computer may determine which disk is inserted based on the information.

Specifically, there is no difference between formats to be written to disks, discriminating a disk to which both the low-level ECC and the high-level ECC are written from a disk to which only the low-level ECC is written. Thus, it is necessary to discriminate between both disks prior to reading from or writing to the disk. In this case, it is useful to write identification numbers of both disks in a region in the disk which is inaccessible to a user.

DESCRIPTION OF THE PREFERRED EMBODIMENT

Figure 1:
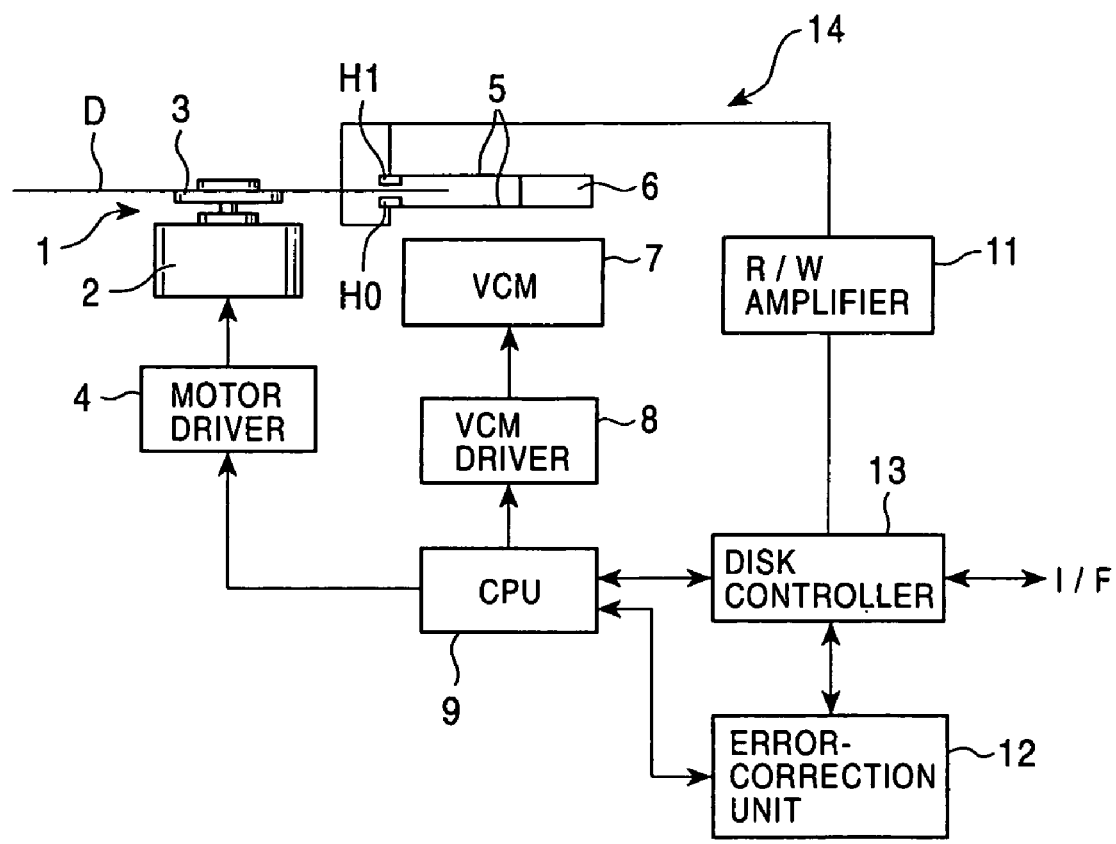
FIG. 1 is a circuit block diagram of a disk device according to an embodiment of the present invention.
Figure 2:
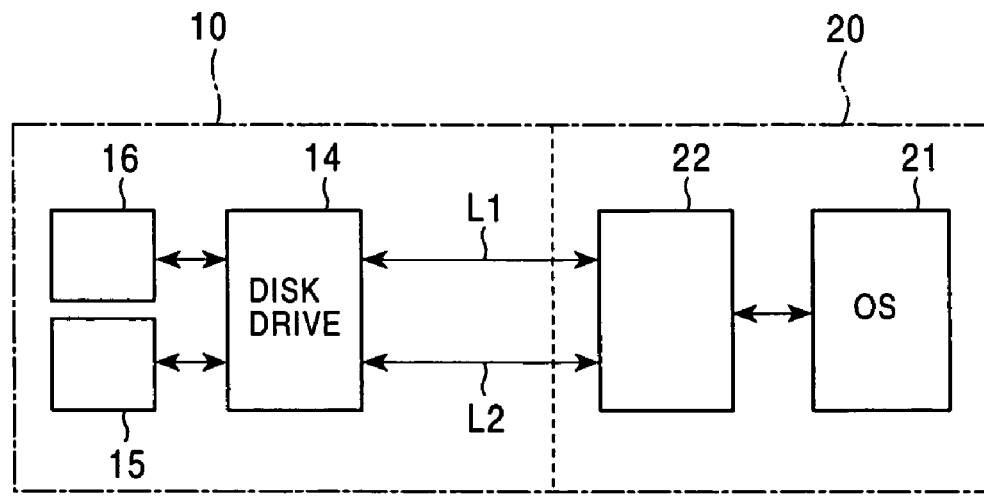
FIG. 2 is an illustration of a method of error-correction processing performed by the disk device shown in FIG. 1.
Figure 3:
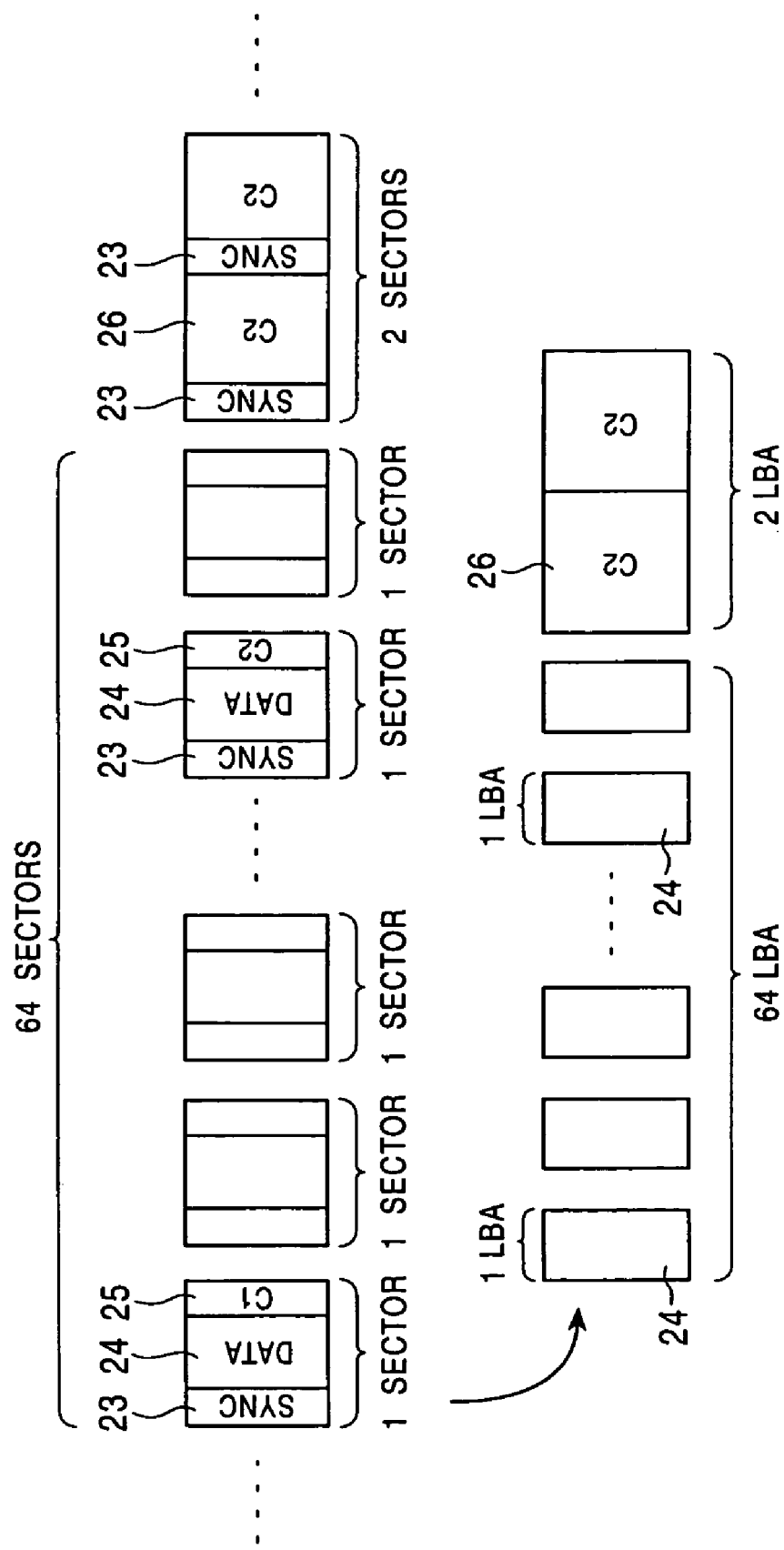
FIG. 3 is an illustration of an ECC format and error-correction processing.
Figure 4:
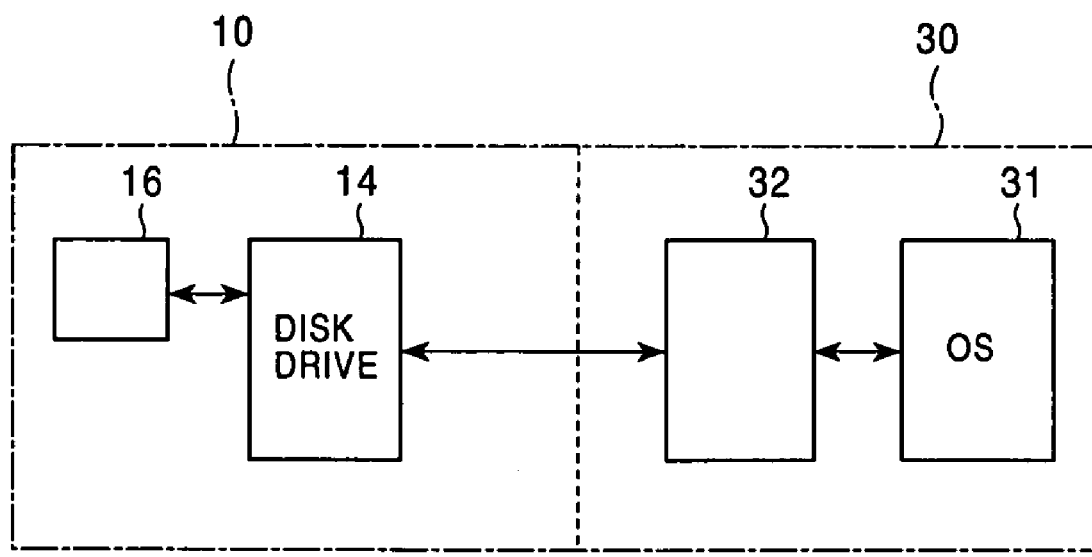
FIG. 4 is an illustration of a method of error-correction processing performed by a conventional disk device.

A disk device according to an embodiment of the present invention is described with reference to the accompanying drawings. FIG. 1 is a block diagram of a disk drive 10 of the disk device according to the embodiment of the present invention. FIG. 2 is an illustration of a method of error-correction processing. FIG. 3 is an illustration of error-correction processing.

The embodiment described hereinafter employs a flexible magnetic disk for high-density storage with a memory capacity of, for example, 200 MB, which is loaded into the disk drive 10.

Referring to FIG. 1, a disk drive body 14 in the disk drive 10 is provided with a rotational driver 1. The rotational driver 1 includes a turntable 3 which is rotatably-driven by a spindle motor 2. The center of a disk D is clamped on the turntable 3. The disk D is a flexible disk for high-density storage. The disk D is inserted from the outside into the disk device to be mounted on the rotational driver 1. The spindle motor 2 is driven and controlled by a motor driver 4.

A magnetic head H0 opposing a side #0 of the disk D and a magnetic head H1 opposing a side #1 of the disk D are supported by a support arm 5 on a head base 6. The head base 6 is driven by a voice coil motor (VCM) 7, i.e., a linear motor driver, in the radial direction of the disk D. The VCM 7 is driven and controlled by a VCM driver 8.

The motor driver 4 and the VCM driver 8 are activated by control signals from a CPU 9 as a controller.

The magnetic heads H0 and H1 are connected to a read/write (R/W) amplifier 11. The R/W amplifier 11 is connected to a disk controller 13. The disk controller 13 is connected via a bus to a host computer 20 through an input/output interface (see FIG. 2). The disk drive body 14 also includes an error-correction unit 12.

A write signal from the host computer 20 is formatted by the disk controller 13. The error-correction unit 12 processes data and adds an ECC to the data, which is then supplied to the magnetic heads H0 and H1 through the R/W amplifier 11. The magnetic heads H0 and H1 read a signal from the disk D, which in turn is supplied from the R/W amplifier 11 to the disk controller 13 to be un-formatted. The read data is supplied to the host computer 20 through a bus in logical block address (LBA) units. The error-correction unit 12 in the disk drive body 14 performs low-level error correction.

Referring now to FIG. 2, the host computer 20 includes therein an OS 21 and a device driver 22 for controlling the disk drive 10. The disk drive 10 includes the disk drive body 14.

A high-reliability disk 15, which is a flexible magnetic disk for high-density storage with a memory capacity of, for example, 200 MB, in which predetermined bits are redundancy bits for high-level error correction, and a disk 16, which also has a memory capacity of 200 MB and to which only a low-level ECC is added, are compatible for loading into the disk drive body 14.

Prior to reading/writing of data, the disk drive body 14 confirms the disk type. This is performed either by a unit for reading a disk-type identification signal written in a predetermined region of a loaded disk and then notifying the host computer 20, or a unit for issuing an appropriate command (for example, a mode-sense command or a "vender-unique" command in accordance with this object) from the host computer 20. Based on the obtained information, the host computer 20 determines whether it is necessary to write data to which the high-level ECC is added (or to read data as if the high-level ECC is added to the data) or to read/write data to which only the low-level ECC is added.

FIG. 3 schematically illustrates a writing format of the high-reliability disk 15. The writing format of the high-reliability disk 15 is such that, for every sector, a SYNC region 23, a region storing data 24, and a region 1 storing a low-level ECC (C1 code) 25 are continuously arranged. The low-level ECC (C1 code) 25 is capable of correcting an error in units of one block (physical block address; PBA) corresponding to data in one sector. For example, the amount of data in one block is 512 Bytes.

A high-level ECC (C2 code) 26 for two sectors is written as redundancy bits every 64 sectors. The high-level ECC 26 is capable of performing high-level error correction in the host computer 20 in units of 64 blocks (logical block address; LBA).

The SYNC region 23 in each sector represents the beginning of the data 24. Synchronization is obtained based on the SYNC region 23, and the data 24 is read.

Although not shown in the drawings, servo information for tracking servo, such as the SYNC region, A burst, and B burst, is written in each sector or a set of sectors in order to correct positional deviations of the magnetic head relative to the disk.

Processing operations performed when the high-reliability disk 15 is loaded into the disk drive body 14 and the magnetic head H0 or H1 reads a signal written to the disk are described below.

A signal read by the magnetic head H0 or H1 is amplified by the R/W amplifier 11, which in turn is sent to the disk controller 13 to be demodulated. Simultaneously, the error-correction unit 12 performs low-level error correction. Specifically, the error-correction unit 12 provided in the disk drive body 14 performs the low-level error correction (C1 correction) based on the C1 code 25. The low-level error correction is performed in data units of one block (PBA) corresponding to the amount of data written in one sector.

The data for which the low-level error correction is performed is sent from the disk controller 13 to the host computer 20 through the input/output interface and a bus line L2. The host computer 20 sends the data for which the low-level error correction is performed to the device driver 22. The device driver 22 performs predetermined data processing and high-level error correction. Then, the data is sent to the OS 21.

The data is transferred from the disk drive body 14 to the host computer 20 in one block (LBA) having, for example, the amount of the data 24 written in one sector. After loading data for 64 blocks (LBAs), the device driver 22 simultaneously reads the high-level ECC (C2 code) for two sectors (LBAs). The C2 correction based on the C2 code for two LBAs is performed in data units of 64 blocks (LBAs). The corrected data is notified to the OS 21.

Even when a reading failure occurs over a plurality of sectors due to, for example, a defect or dirt on the surface of the disk, it is possible to recover, using high-level error correction based on the high-level ECC (C2 code) 26, data that cannot be recovered by error correction based on the C1 code 25.

When the disk 16 to which only the C1 code 25 is written is loaded into the disk drive 10 and a signal is read therefrom, the error-correction unit 12 provided in the disk drive body 14, as shown in FIG. 1, performs low-level error correction based on the C1 code. The corrected data is sent to the device driver 22 through a bus line L1 and the input/output interface. This in turn is processed and notified to the OS 21.

Specifically, the device driver 22 may perform data processing of both the data read from the high-reliability disk 15 having the C1 code 25 and the C2 code 26 and the data read from the disk 16 having only the C1 code 25.

When the error-correction unit 12 of the disk drive body 14 performs error correction using the C1 code, a predetermined number, such as 32, of retry operations are performed until the corrected data is recovered to a predetermined rate. Specifically, when the error rate of the read data is high, the data is repeatedly read until the data on the same sector can be recovered.

If the data is not recovered even after the predetermined number of retry operations, the retrying is terminated. When the loaded disk is the disk 16, which is not a high-reliability type, upon termination of the retrying it is established that data reading is impossible. This is notified to the device driver 22 of the host computer 20.

In contrast, when the loaded disk is the high-reliability disk 15, even when data cannot be recovered after the predetermined number of retry operations, the data is sent to the device driver 22 of the host computer 20. As described above, the high-level error correction using the C2 code 26 is performed. When the data cannot be recovered even with this error correction, a reading failure occurs.

Since the ECC (C2 code) 26 for two sectors is added to the high-reliability disk 15 every 64 sectors, the region available for a user is smaller than that of the disk 16, which is not a high reliability type. For example, when the disk 16 has a 200 MB memory capacity, the memory capacity (redundancy) required for the C2 code 26 is approximately 6 MB (=200 MB×2/(64+2)). The region available to the user is therefore decreased to approximately 194 MB.

The capacity of the C2 code 26 can be changed, as necessary, according to the required disk reliability. For example, when increasing reliability, the capacity is changed by increasing redundancy. This may be performed by adding a C2 code of more than two sectors or by adding a C2 code fewer than every 64 sectors.

When the redundancy is changed as described above, disks with different redundancies have different processing modes. It is therefore necessary to provide different disk-type identification information to be written on the disks.

When the disk device writes data to a disk, the data is sent from the OS 21 to the device driver 22, and is then transferred to the disk drive 10 through the bus line L2 in LBA units. Simultaneously, the device driver 22 processes the data in units of, for example, 64 LBAs, and generates the C2 code 26. After transferring the data for 64 LBAs, the C2 code 26 for two LBAs is sent to the disk drive body 14 through the bus line L2.

The disk drive body 14 performs predetermined formatting, such as for the SYNC region 23 and the data 24, in one PBA unit. Simultaneously, the error-correction unit 12 processes the data in one PBA as one unit and generates the C1 code 25. The generated C1 code is added to the data, which in turn is written to the disk by means of the magnetic heads H0 and H1.

Accordingly, the disk device is capable of forming the high-reliability disk 15.

When the disk device writes data to the disk, the C2 code 26 may not be added, and only the C1 code 25 may be added, thus forming the disk 16.

When the high-reliability disk 15 or the disk 16 is formed, a specific disk-type identification signal is written in a predetermined region.

The disk device according to the present invention is not limited to the above embodiment. The present invention is not limited to disk device for reading/writing the above flexible magnetic disk for high-density storage, and alternatively, may be applied to a disk device for reading/writing another disk, such as an optical disk or a magneto-optical disk. Changes and variations may be made without departing from the spirit of the invention. For example, it is possible to change the space between the C2 codes 26 or the memory capacity to be allocated.

What is claimed is:

1. A disk device comprising:
    a disk drive including a head for reading data written to a disk and a processing circuit for processing the data; and
    a host computer connected to said disk drive through an interface;
    wherein the processing circuit of said disk drive includes a low-level error-correction code unit for performing error correction of the data written to a physical address corresponding to a single sector of the disk,
    the host computer includes a high level error correction code unit for performing error correction of the read data supplied through the interface and read from more than one sector of the disk,
    a high-reliability disk to which both a low-level error-correction code and a high-level error-correction code are written and a disk to which only the low-level error-correction code is written are loadable into said disk drive,
    when the high-reliability disk is loaded, the processing circuit of said disk drive performs low-level error correction, and then said host computer, to which the correction data is supplied, performs high level error correction, and
    when the latter disk is loaded, the processing circuit of said disk drive performs low-level error correction, and said host computer processes the corrected data.

2. A disk device comprising;
    a disk drive including a head for reading data written to a disk and a processing circuit for processing the data: and
    a host computer connected to said disk drive through an interface;
    wherein the processing circuit of said disk drive includes a low-level error-correction code unit for performing error correction of the data written to a physical address corresponding to a single sector of the disk,
    the host computer includes a high level error correction code unit for performing error correction of the read data supplied through the interface and read from more than one sector of the disk,
    information is written to the disk for discriminating a high-reliability disk to which both a low-level error-correction code and a high-level error-correction code are written from a disk to which only the low-level error correction is written, and
    said host computer determines which disk is inserted based on the information.

* * * * *